（12） United States Patent
Sun et al.

(10) Patent No.: US 12,322,176 B2
(45) Date of Patent: Jun. 3, 2025

(54) VIDEO CLASSIFICATION SYSTEM, VIDEO CLASSIFICATION METHOD, AND NEURAL NETWORK TRAINING SYSTEM

(71) Applicant: REALTEK SEMICONDUCTOR CORP., Hsinchu (TW)

(72) Inventors: Ling Sun, Hsinchu (TW); Yen-Hsun Chu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 659 days.

(21) Appl. No.: 17/734,384

(22) Filed: May 2, 2022

(65) Prior Publication Data

US 2023/0154189 A1 May 18, 2023

(30) Foreign Application Priority Data

Nov. 17, 2021 (CN) .......................... 202111361814.4

(51) Int. Cl.
*G06V 20/40* (2022.01)
*G06V 10/774* (2022.01)
*G06V 10/82* (2022.01)
*G06V 10/94* (2022.01)

(52) U.S. Cl.
CPC ............ *G06V 20/41* (2022.01); *G06V 10/774* (2022.01); *G06V 10/82* (2022.01); *G06V 10/95* (2022.01); *G06V 20/46* (2022.01); *G06V 20/49* (2022.01)

(58) Field of Classification Search
CPC ...... G06V 20/41; G06V 20/46; G06V 10/774; G06V 20/49
See application file for complete search history.

(56) References Cited

U.S. PATENT DOCUMENTS

2022/0138573 A1* 5/2022 Serra Lleti ............. G06N 3/045
706/15

OTHER PUBLICATIONS

Ianeva et al., "Detecting Cartoons: A Case Study in Automatic Video-Genre Classification", International Conference on Multimedia and Expo. ICME '03. Proceedings, IEEE, 2003, pp. 1-4.

* cited by examiner

*Primary Examiner* — Myron Wyche
(74) *Attorney, Agent, or Firm* — Birch, Stewart, Kolasch & Birch, LLP

(57) ABSTRACT

A video classification system and method and a neural network training system are provided. The video classification system captures multiple sampled images, encodes first and second images of all sampled images into feature matrices of the sampled images using a convolutional neural network module, and obtains the classification of the videos based on a recurrent neural network module and the feature matrices. The neural network training system captures multiple first sampled images and uses first training samples of all the first sampled images to train the convolutional neural network module and a classification module to obtain multiple parameter values of the convolutional neural network module. The neural network training system trains the recurrent neural network module based on the parameter values and multiple second sampled images.

15 Claims, 10 Drawing Sheets

VIDEO CLASSIFICATION SYSTEM, VIDEO CLASSIFICATION METHOD, AND NEURAL NETWORK TRAINING SYSTEM

CROSS-REFERENCE TO RELATED APPLICATION

This non-provisional application claims priority under 35 U.S.C. § 119(a) to Patent Application No. 202111361814.4 filed in China, P.R.C. on Nov. 17, 2021, the entire contents of which are hereby incorporated by reference.

BACKGROUND

Technical Field

The present invention relates to the field of video classification, and in particular, to technologies of applying neural network to video classification.

Related Art

Animations are an important part of the TV industry. They are the most popular entertainment for children. Moreover, there is an increasingly number of animated videos and movies available to audiences of all ages. Now, we can watch a large number of animated videos not only on traditional cable TV but also on streaming media services. In this case, how to improve the user's experience of watching animated videos on TV has become an important issue. In order to achieve this goal, an effective system and method are required to detect a video in real time, to classify whether the video is an animation, and to apply different enhancement effects to the video according to a detection result.

SUMMARY

In view of this, some embodiments of the present invention provide a video classification system, a video classification method, and a neural network training system to improve the existing technical problem.

An embodiment of the present invention provides a video classification system. The video classification system includes: a processor, a convolutional neural network module, and a recurrent neural network module. The processor is configured to obtain a video. The convolutional neural network module has a plurality of trained first parameters. The recurrent neural network module has a plurality of trained second parameters. The processor is configured to perform the following steps: selecting a present time point according to a time interval, and sampling the video according to the present time point to obtain a sampled image at the present time point; adjusting a pixel size of the sampled image at the present time point to obtain a corresponding first image, where a pixel size of the first image is a first pixel size, and the first pixel size of the first image is smaller than the pixel size of the sampled image; performing image cropping on the sampled image at the present time point to obtain at least one corresponding partial image, and obtaining a corresponding second image based on the at least one partial image, where a pixel size of the second image is the first pixel size; using the convolutional neural network module to encode the first image and the second image of the sampled image at the present time point into a feature vector corresponding to the sampled image at the present time point; sequentially merging the feature vector corresponding to the present time point with a plurality of past feature vectors corresponding to a plurality of past time points into a feature matrix; and obtaining a classification of the video based on the recurrent neural network module and the feature matrix.

An embodiment of the present invention provides a video classification method, performed by a processor. The video classification method includes the following steps: selecting a present time point according to a time interval, and sampling the video according to the present time point to obtain a sampled image at the present time point; adjusting a pixel size of the sampled image at the present time point to obtain a corresponding first image, where a pixel size of the first image is a first pixel size, and the first pixel size of the first image is smaller than the pixel size of the sampled image; performing image cropping on the sampled image at the present time point to obtain at least one corresponding partial image, and obtaining a corresponding second image based on the at least one partial image, where a pixel size of the second image is the first pixel size; using the convolutional neural network module to encode the first image and the second image of the sampled image at the present time point into a feature vector corresponding to the sampled image at the present time point; and sequentially merging the feature vector corresponding to the present time point with a plurality of past feature vectors corresponding to a plurality of past time points into a feature matrix.

An embodiment of the present invention provides a neural network training system. The neural network training system includes: a processor, a convolutional neural network module, a recurrent neural network module, and a classification module. The processor is configured to obtain a plurality of videos, a plurality of training images, and a classification corresponding to each of the plurality of videos and each of the plurality of training images. The convolutional neural network module has a plurality of first parameters, the recurrent neural network module has a plurality of second parameters, and the classification module has a plurality of third parameters. The processor is configured to perform the following steps: obtaining a plurality of first sampled images from the videos and the training images; selecting an unselected image from the plurality of first sampled images as a current image; adjusting a pixel size of the current image to obtain a corresponding first image, where a first pixel size of the first image is smaller than the pixel size of the current image; performing image cropping on the current image to obtain at least one corresponding first partial image, and obtaining a corresponding second image based on the at least one corresponding first partial image, where a pixel size of the second image is the first pixel size; setting the classification corresponding to the first image, the second image, and the current image as a first training sample corresponding to the current image; repeating the foregoing steps until the plurality of first sampled images are all selected; using all the first training samples corresponding to each of the plurality of first sampled image to train a first synthesis network synthesized by the convolutional neural network module and the classification module, to obtain a plurality of first parameter values corresponding to the plurality of first parameters; and training the recurrent neural network module based on the first parameter values and a plurality of second sampled images obtained from each of the plurality of videos, to obtain a plurality of second parameter values corresponding to the plurality of second parameters.

Based on the above, some embodiments of the present invention provide a video classification system, a video classification method, and a neural network training system, so that a video classification result can be quickly obtained by performing video classification on multiple sampling frames of a real-time video in advance using a convolutional neural network module and a recurrent neural network module trained using images having two different types of information included in images captured from a video.

BRIEF DESCRIPTION OF THE DRAWINGS

FIG. 2-1 is a schematic operation diagram of a video classification system 100 shown according to some embodiments of the present invention;

FIG. 2-2 is a schematic operation diagram of a video classification system 100 shown according to some embodiments of the present invention;

DETAILED DESCRIPTION

Figure 1:
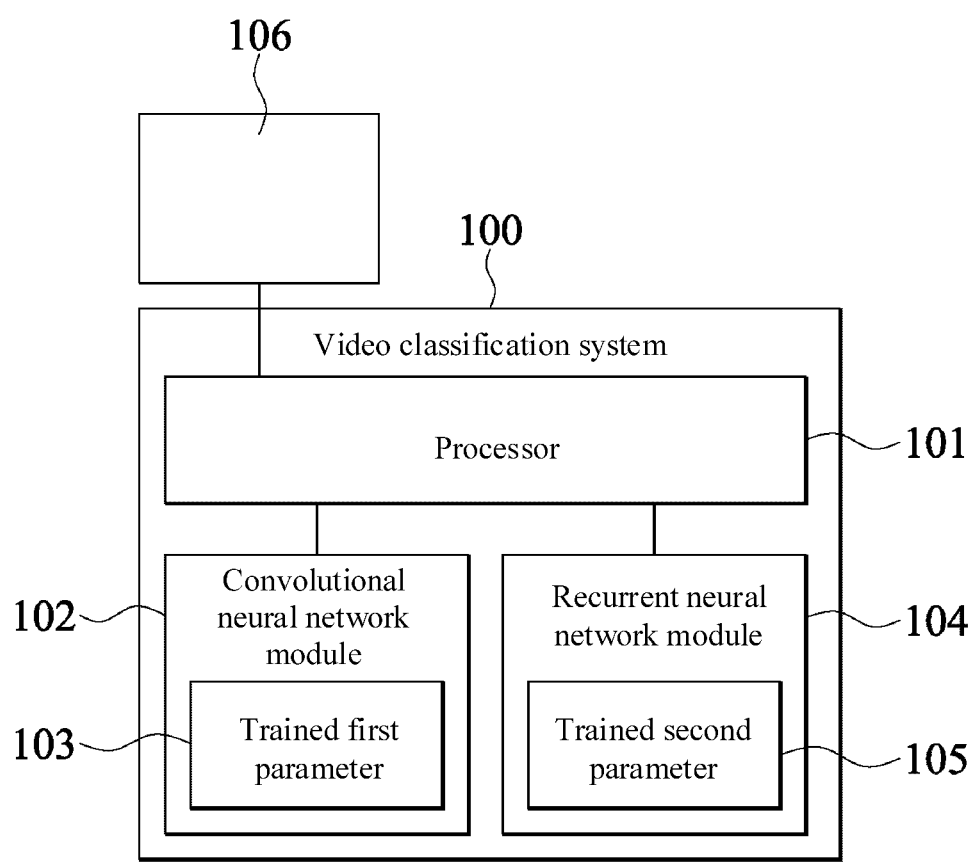
FIG. 1 is a block diagram of a video classification system shown according to an embodiment of the present invention.

The foregoing and other technical contents, features, and effects of the present invention can be clearly presented below in detailed description with reference to embodiments of the accompanying drawings. Thicknesses or sizes of the elements in the drawings expressed in an exaggerated, omitted or general manner are used to help a person skilled in the art to understand and read, and the size of each element is not a completely actual size and is not intended to limit restraint conditions under which the present invention can be implemented and therefore have no technical significance. Any modification to the structure, change to the proportional relationship or adjustment on the size should fall within the scope of the technical content disclosed by the present invention without affecting the effects and the objectives that can be achieved by the present invention. The same reference numerals are used to indicate the same or similar elements in all of the drawings.

FIG. 1 is a block diagram of a video classification system shown according to an embodiment of the present invention. Referring to FIG. 1, the video classification system 100 includes: a processor 101, a convolutional neural network module 102, and a recurrent neural network module 104. The processor 101 is configured to obtain a video 106. The convolutional neural network module 102 has a plurality of trained first parameters 103. The recurrent neural network module 104 has a plurality of trained second parameters 105. The video 106 may be classified into two categories: animation and non-animation.

In some embodiments of the present invention, the video classification system 100 is implemented in a single-chip microcontroller (such as 8051), the processor 101 is a central processing unit (CPU) of the single-chip microcontroller, and the convolutional neural network module 102 is a model that has a convolutional neural network (CNN) structure and that is stored in a memory of the single-chip microcontroller (for example, a model that has a convolutional neural network structure and that is designed using Pytorch or Tensorflow). The recurrent neural network module 104 is a model that has a recurrent neural network (RNN) structure and that is stored in the memory of the single-chip microcontroller (for example, a model that has a recurrent neural network structure and that is designed by Pytorch or Tensorflow). The trained first parameter 103 and the trained second parameter 105 are memory locations where trained parameter values are stored.

In some embodiments of the present invention, the video classification system 100 is implemented on a network system, and the convolutional neural network module 102 is a model that has a convolutional neural network structure and that is stored in a network space. The recurrent neural network module 104 is a model that has a recurrent neural network structure and that is stored in the network space. The processor 101 accesses the convolutional neural network module 102 and the recurrent neural network module 104 through the network.

A video classification method and cooperative operation between modules of the video classification system 100 according to some embodiments of the present invention are described in detail below with reference to the drawings.

Figures 1, 2:
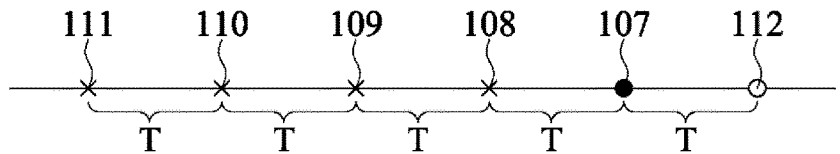
Figure 2:
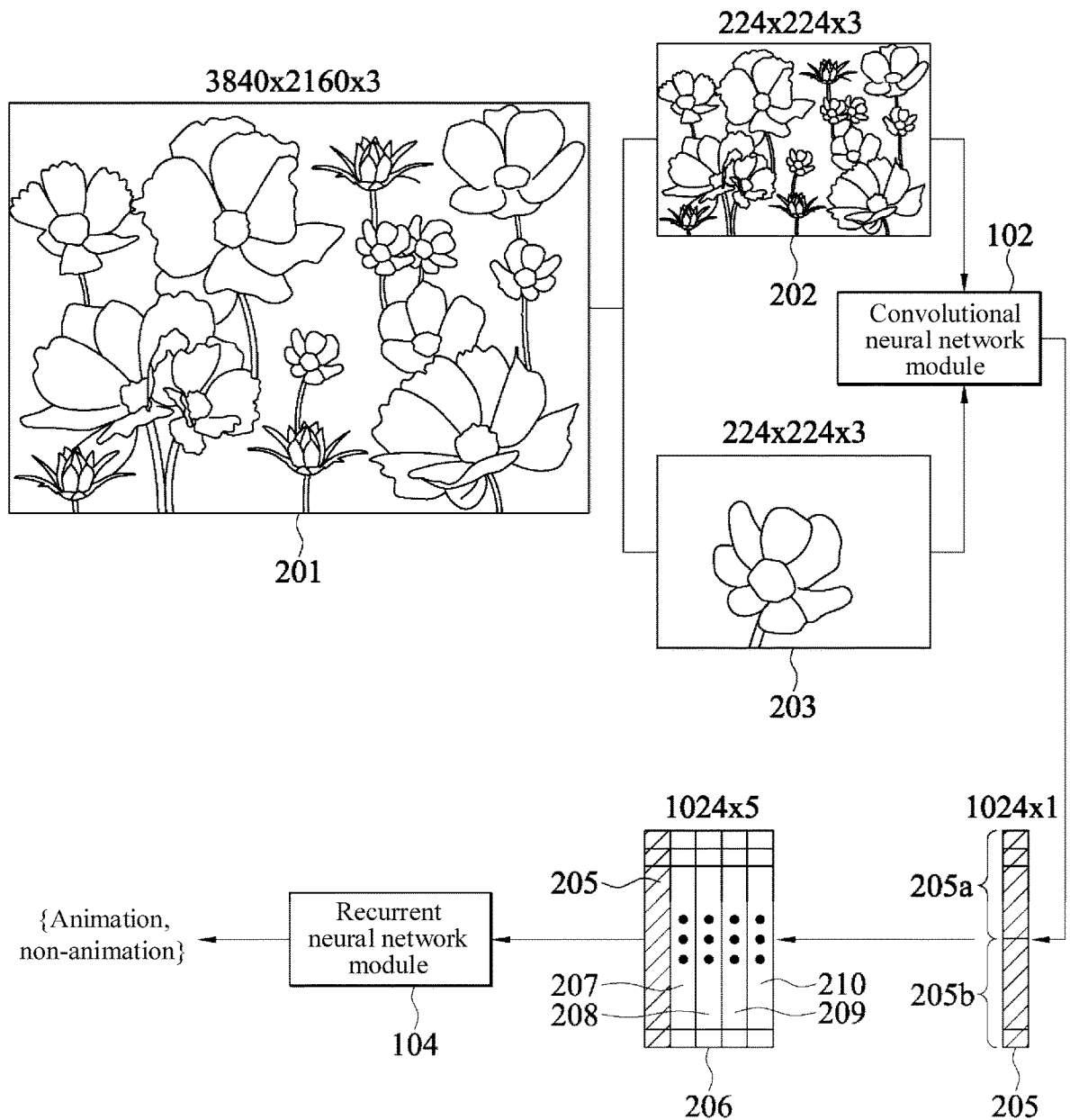
Figure 8:
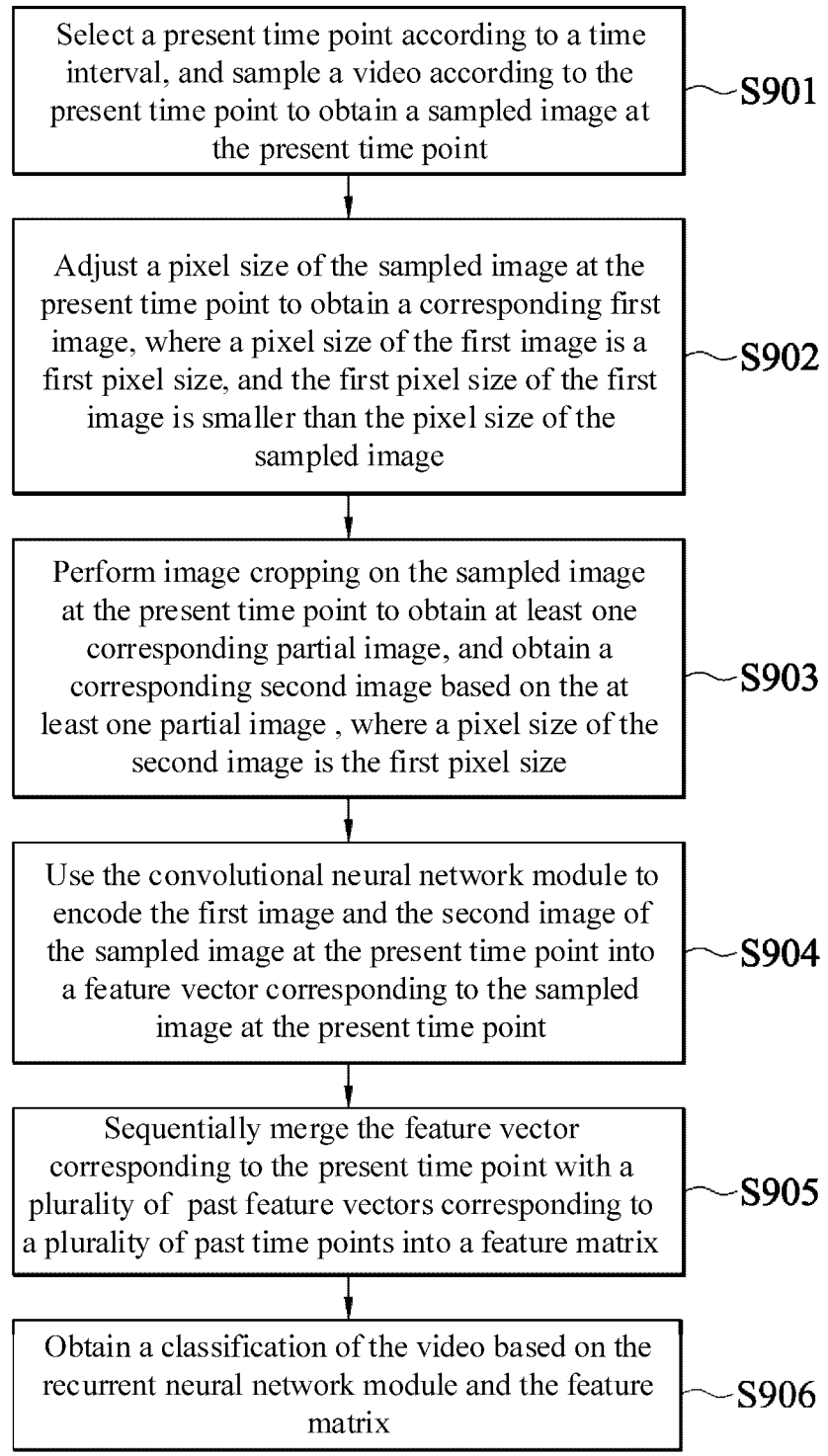
FIG. 8 is a flowchart of a video classification method shown according to some embodiments of the present invention.

FIG. 2-1 and FIG. 2-2 are schematic operation diagrams of the video classification system 100 shown according to some embodiments of the present invention. FIG. 8 is a flowchart of a video classification method shown according to some embodiments of the present invention. Referring to FIG. 1, FIG. 2-1, FIG. 2-2, and FIG. 8 together, in step S901, the processor 101 selects a present time point 107 according to a time interval T. The processor 101 samples the video according to the present time point 107 to obtain a sampled image 201 at the present time point 107.

In step S902, the processor 101 adjusts a pixel size of the sampled image 201 at the present time point 107 to obtain a corresponding first image 202. A pixel size of the first image 202 is a first pixel size. The first pixel size of the first image is smaller than the pixel size of the sampled image 201. In the example shown in FIG. 2-2, the first pixel size is 224×224×3, and the pixel size of the sampled image 201 is 3840×2160×3, where 3 represents three components: red (R), green (G), and blue (B). It should be noted that, in this embodiment, the first pixel size is selected as 224×224×3, and the pixel size of the sampled image is selected as 3840×2160×3, but the selection of the pixel size needs to be based on the resolution of the video or the player. The present invention is not limited to this.

In step S903, the processor 101 performs image cropping on the sampled image at the present time point 107 to obtain at least one corresponding partial image. In this embodiment, the processor 101 performs image cropping at a middle position of the sampled image to obtain a cropped image 203 whose pixel size is the first pixel size (224×224×3 in this example), and uses the cropped image 203 as a second image. That is, in this embodiment, the number of partial images is one, and the second image is equivalent to the partial image.

Figure 9:
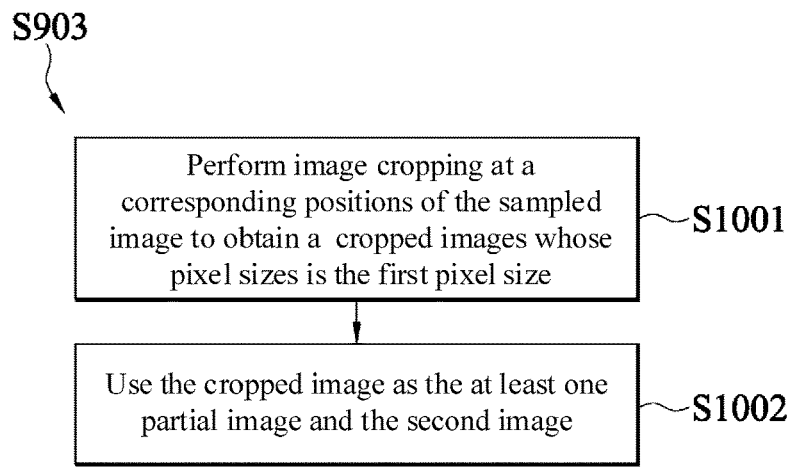
FIG. 9 is a flowchart of a video classification method shown according to some embodiments of the present invention.

FIG. 9 is a flowchart of a video classification method shown according to some embodiments of the present invention. Referring to FIG. 9 together. In the embodiment shown in FIG. 9, step S903 further includes step S1001 and step S1002. In step S1001, the processor 101 performs image cropping at other fixed positions of the sampled image 201 at the present time point 107 (different from the middle position in the foregoing embodiment) to obtain the cropped image 203 whose pixel size is the first pixel size (224×224×3 in this example), and uses the cropped image 203 as the second image in step S1002.

Figure 10:
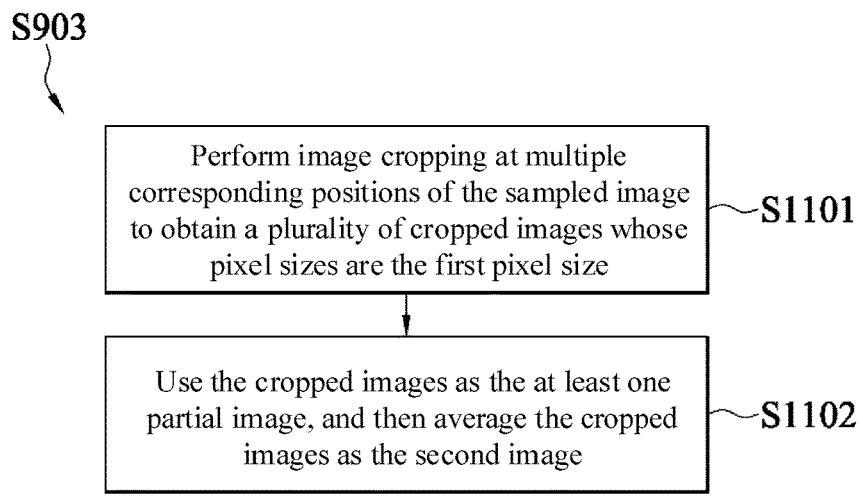
FIG. 10 is a flowchart of a video classification method shown according to some embodiments of the present invention.

FIG. 10 is a flowchart of a video classification method shown according to some embodiments of the present invention. Referring to FIG. 10 together. In the embodiment shown in FIG. 10, step S903 further includes step S1101 and step S1102. In step S1101, the processor 101 performs image cropping at a plurality of corresponding positions of the sampled image 201 at the present time point 107 to obtain multiple cropped images whose pixel sizes are the first pixel size (224×224×3 in this example). In step S1102, the processor 101 uses the cropped images as the at least one partial image. The processor 101 then averages the value of each pixel to average the cropped images as a second image.

In step S904, the processor 101 then uses the convolutional neural network module 102 to encode the first image and the second image of the sampled image 201 at the present time point 107 into a feature vector 205 corresponding to the sampled image at the present time point 107. In step S905, the processor 101 sequentially merges the feature vector 205 at the present time point 107 with past feature vectors 207, 208, 209, and 210 obtained at previous four past time points 108, 109, 110, and 111 into a feature matrix 206. The past feature vector 207 is a past feature vector corresponding to the past time point 108, the past feature vector 208 is a past feature vector corresponding to the past time point 109, and so on. In step S906, the processor 101 obtains a classification of the video 106 based on the recurrent neural network module 104 and the feature matrix. In this embodiment, the classification of the video 106 is animation or non-animation. It should be noted that, in this embodiment, the processor 101 merges the past feature vectors 207, 208, 209, and 210 obtained at the previous four past time points 108, 109, 110, and 111 with the feature vector 205 at the present time point 107 to obtain the feature matrix 206, but the present invention is not limited to merging the past feature vectors at the previous four past time points, and past feature vectors at other numbers of past time points may also be merged.

Figure 11:
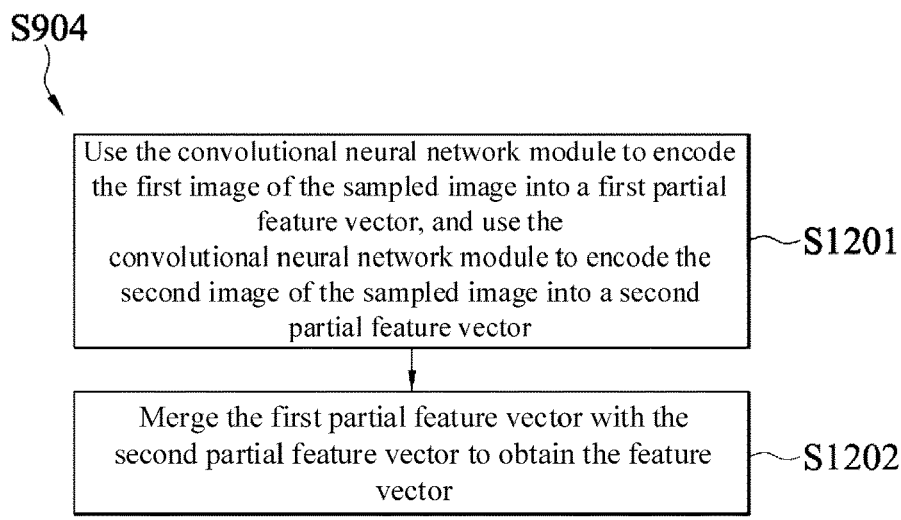
FIG. 11 is a flowchart of a video classification method shown according to some embodiments of the present invention.

FIG. 11 is a flowchart of a video classification method shown according to some embodiments of the present invention. Referring to FIG. 11, and referring to FIG. 2-1 and FIG. 2-2 together, in the embodiment shown in FIG. 11, step S904 further includes step S1201 and step S1202. In step S1201, the processor 101 uses the convolutional neural network module 102 to encode the first image of the sampled image 201 into a first partial feature vector 205a, where a dimension of the first partial feature vector 205a is 512×1. The processor 101 uses the convolutional neural network module 102 to encode the second image of the sampled image 201 into a second partial feature vector 205b, where a dimension of the second partial feature vector 205b is 512×1. In step S1202, the processor 101 merges the first partial feature vector 205a with the second partial feature vector 205b to obtain the feature vector 205, where a dimension of the feature vector 205 is 1024×1.

In some embodiments of the present invention, after the present time point 107, the processor 101 selects a time point 112 as the present time point according to the time interval T, and repeats the foregoing processing procedure. When the processor 101 sets the time point 112 as the present time point, the original present time point 107 is set as a past time point relative to the time point 112 by the processor 101, and the feature vector 205 corresponding to the present time point 107 is set as a past feature vector by the processor 101.

In some embodiments of the present invention, after obtaining past feature vectors at a sufficient number of past time points (four in the foregoing embodiment), the processor 101 obtains the classification of the video 106 based on the recurrent neural network module 104 and the feature matrix.

In some embodiments of the present invention, the convolutional neural network module 102 is a modified ShuffleNet V2 model. The modified ShuffleNet V2 model is an output layer for modifying ShuffleNet V2 so that an input image whose pixel size is 224×224×3 may be input to the modified ShuffleNet V2 model, and the modified ShuffleNet V2 model outputs a vector whose dimension is 512×1. This vector of 512×1 is a feature vector generated by the ShuffleNet V2 model corresponding to the input image.

It is also worth noting that due to a unique design structure, a long short-term memory (LSTM) network in the recurrent neural network is suitable for processing and predicting important events with quite long intervals and delays in time series. Therefore, in an embodiment of the present invention, a long short-term memory network is selected as the recurrent neural network module 104.

In the foregoing embodiment, how to use the convolutional neural network module 102 and the recurrent neural network module 104 having trained parameters to detect the classification (animation or non-animation) of the video 106 is mainly disclosed. In the following embodiments, how to obtain the trained parameters is disclosed.

Figure 3:
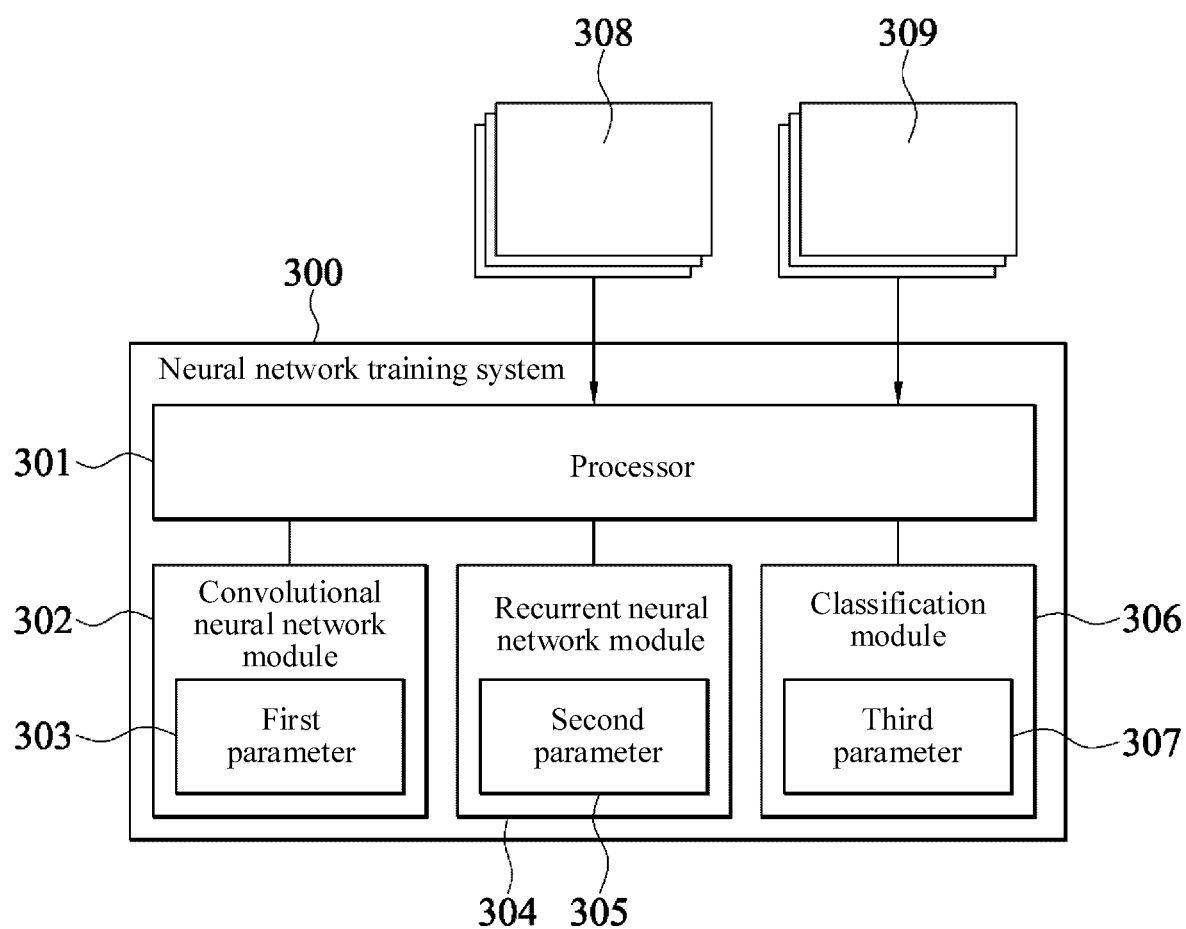
FIG. 3 is a block diagram of a neural network training system shown according to an embodiment of the present invention.

FIG. 3 is a block diagram of a neural network training system shown according to an embodiment of the present invention. Referring to FIG. 3, the neural network training system 300 includes: a processor 301, a convolutional neural network module 302, a recurrent neural network module 304, and a classification module 306. The processor 301 is configured to obtain a plurality of videos 308, a plurality of training images 309, and a classification (animation or non-animation in this embodiment) corresponding to each video 308 and each training image 309. The convolutional neural network module 302 has a plurality of first parameters 303. The recurrent neural network module 304 has a plurality of second parameters 305. The classification module 306 has a plurality of third parameters 307.

In some embodiments of the present invention, the neural network training system 300 is implemented on a server, the processor 101 is a CPU or a tensor processing unit (TPU) of the server, and the convolutional neural network module 302 is a model that has a convolutional neural network structure and that is stored in a memory of the server (for example, a model that has a convolutional neural network structure and that is designed using Pytorch or Tensorflow). The recurrent neural network module 304 is a model that has a recurrent neural network structure and that is stored in the memory of the server (for example, a model that has a recurrent neural network structure and that is designed using Pytorch or Tensorflow). The classification module 306 is a model that has a multiclass classifier structure and that is stored in the memory of the server (for example, a model that has a multiclass classifier structure and that is designed using Pytorch or Tensorflow). The first parameter 303, the second parameter 305, and the third parameter 307 are memory locations where parameter values are stored.

A neural network training method and cooperative operation between modules of the neural network training system 300 according to some embodiments of the present invention are described in detail below with reference to the drawings.

Figure 4:
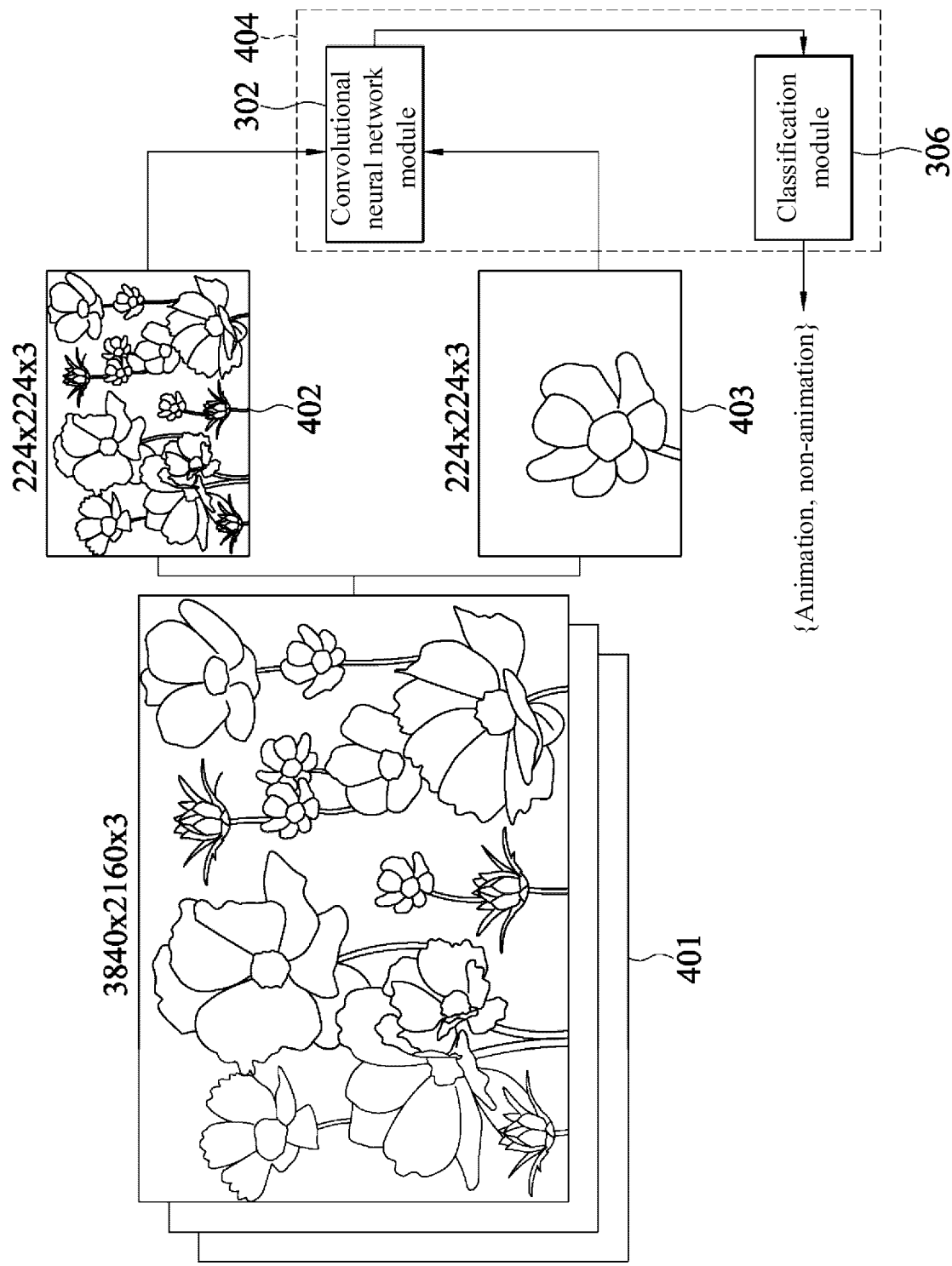
FIG. 4 is a schematic operation diagram of a neural network training system 300 shown according to some embodiments of the present invention.
Figure 12:
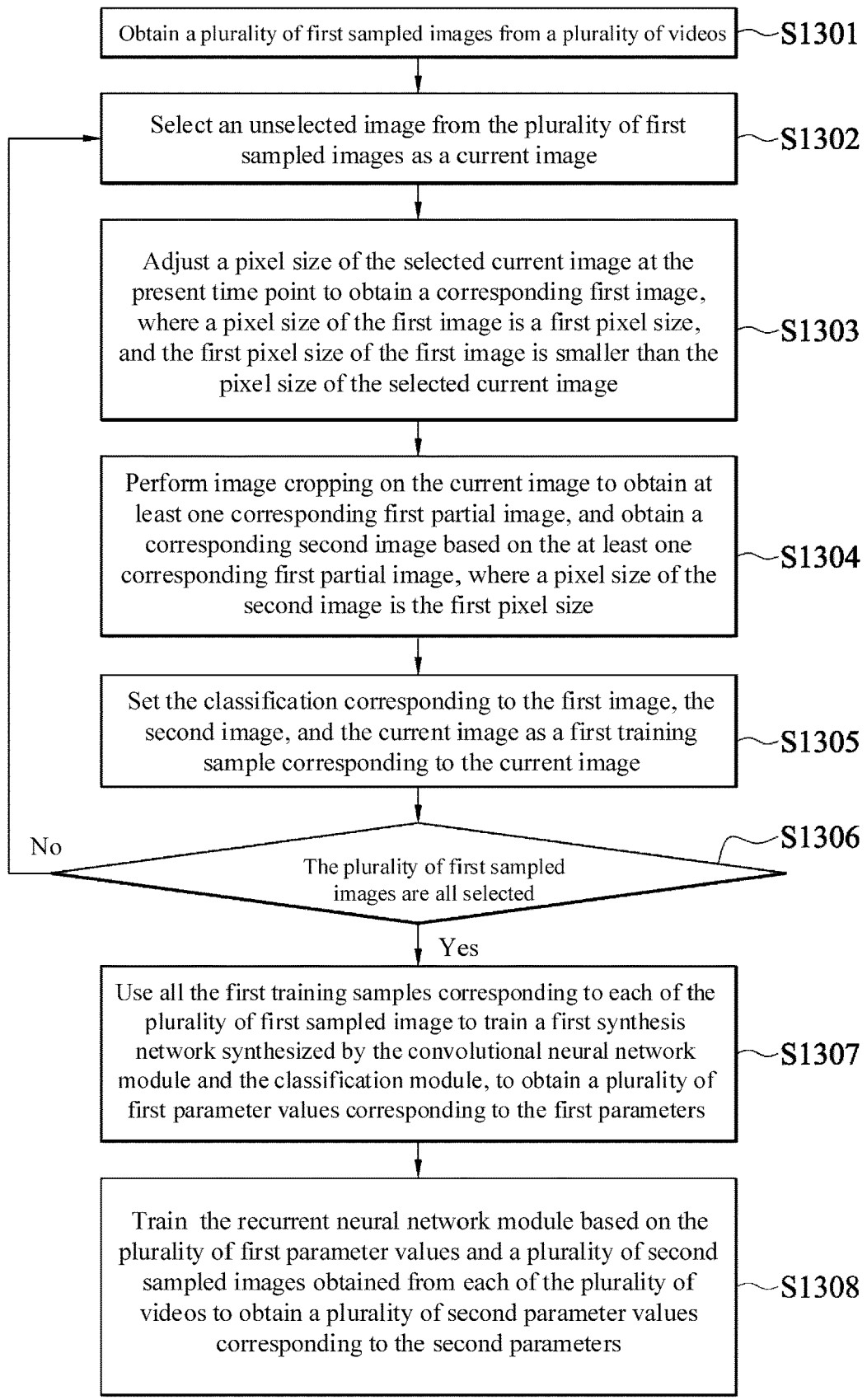
FIG. 12 is a flowchart of a neural network training method shown according to some embodiments of the present invention.

FIG. 4 is a schematic operation diagram of the neural network training system 300 shown according to some embodiments of the present invention. FIG. 12 is a flowchart of a neural network training method shown according to some embodiments of the present invention. Referring to FIG. FIG. 3, FIG. 4, and FIG. 12 together, in step S1301, the processor 301 obtains a plurality of first sampled images 401 from the received video 308 and training image 309. The classification of each first sampled image 401 is the same as the classification of the source video 308 or training image 309. For example, when one of the plurality of first sampled images 401 is captured from an animated video, the classification of this image is animation. In another example, when one of the plurality of first sampled images 401 is selected from the training image 309, the classification of this image is the classification of the image selected from the training image 309. In step S1302, the processor 301 selects an unselected image from the plurality of first sampled images 401 as a current image.

In step S1303, the processor 301 adjusts a pixel size of the selected current image to obtain a corresponding first image 402. A pixel size of the first image 402 is the first pixel size, and the first pixel size of the first image is smaller than the pixel size of the selected current image. In the example shown in FIG. 4, the first pixel size is 224×224×3, and the pixel size of the current image is 3840×2160×3, where 3 represents three components: red (R), green (G), and blue (B). It should be noted that, in this embodiment, the first pixel size is selected as 224×224×3, and the pixel size of the current image is selected as 3840×2160×3, but the selection of the pixel size needs to be based on the resolution of the video. The present invention is not limited to this.

In step S1304, the processor 301 performs image cropping on the current image to obtain at least one corresponding first partial image, and obtains a corresponding second image based on the at least one first partial image. In this embodiment, the processor 301 performs image cropping at a middle position of the current image to obtain a cropped image 403 whose pixel size is the first pixel size (224×224×3 in this example), and uses the cropped image 403 as the second image. In this embodiment, the number of the first partial images is one, and the second image is equivalent to the first partial image.

In some embodiments of the present invention, the processor 301 performs image cropping at other fixed positions, to obtain the cropped image 403 whose pixel size is the first pixel size (224×224×3 in this example), and uses the cropped image 403 as the second image.

In some embodiments of the present invention, the processor 301 performs image cropping at multiple corresponding positions of the current image to obtain multiple cropped images whose pixel sizes are the first pixel size (224×224×3 in this example). The cropped images are the foregoing at least one partial image. The processor 301 then averages the value of each pixel to average the cropped images as the second image.

In step S1305, the processor 301 sets the classification corresponding to the first image, the second image, and the current image as a first training sample corresponding to the current image. In step S1306, the processor 301 repeats steps S1302, S1303, S1304, and S1305 until the first sampled images are all selected. After the first sampled images are all selected, each first sampled image has a corresponding first training sample. In step S1307, all the first training samples corresponding to each first sampled image are used to train a first synthesis network 404 synthesized by the convolutional neural network module 302 and the classification module 306, to obtain a plurality of first parameter values corresponding to the first parameters 303.

After step S1307, the processor 301 has obtained the plurality of first parameter values corresponding to the first parameters 303, that is, trained parameters of the convolutional neural network module 302. Next, the processor 301 obtains multiple second parameter values of the second parameter 305 of the recurrent neural network module 306 based on the plurality of first parameter values corresponding to the plurality of first parameters 303 (that is, the trained parameters of the convolutional neural network module 302).

In step S1308, the processor 301 then obtains, from each of the plurality of videos, a plurality of second sampled images of each of the plurality of videos. The processor 301 trains the recurrent neural network module 304 based on the first parameter values and a plurality of second sampled images obtained from each of the plurality of videos, to obtain the plurality of second parameter values corresponding to the plurality of second parameters 305.

It should be noted that, before the processor 301 trains the first synthesis network 404 synthesized by the convolutional neural network module 302 and the classification module 306, the first parameter 303 of the convolutional neural network module 302 needs to be pre-stored with an initial value. The processor 301 may randomly set the initial value of the first parameter based on a random value generating function provided by an existing programming language package. The processor 301 may also use a trained parameter that has been trained in another similar task as the initial value of the first parameter 303 of the convolutional neural network module 302.

Figure 7:
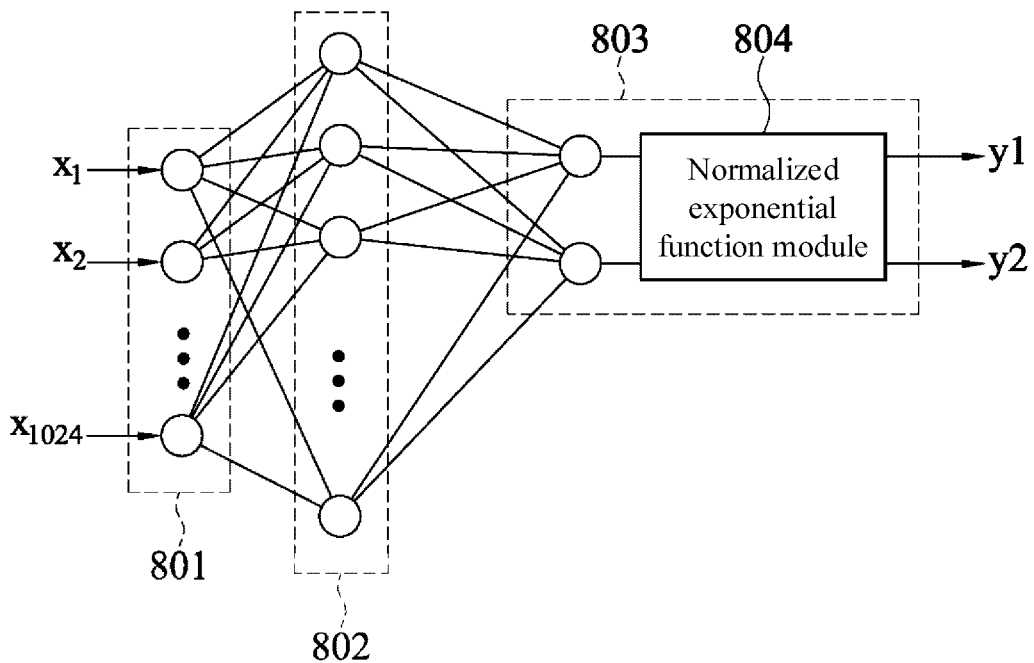
FIG. 7 is a schematic architectural diagram of a classification module 306 shown according to some embodiments of the present invention.

FIG. 7 is a schematic architectural diagram of the classification module 306 shown according to some embodiments of the present invention. The classification module 306 includes an input layer 801, a hidden layer 802, and an output layer 803. The input layer 801 includes 1024 input neurons. $x_1, x_2 \ldots x_{1024}$ are input signals. The output layer 803 includes two output neurons and a normalized exponential function (softmax) module 804. The normalized exponential function (softmax) module 804 may make the sum of outputs $y_1$ and $y_2$ be 1 and both fall in between 0 and 1. $y_1$ represents the probability that the input belongs to a first category, and $y_2$ represents the probability that the input belongs to a second category. In this embodiment, before training the first synthesis network 404 synthesized by the convolutional neural network module 302 and the classification module 306, the processor 301 randomly sets an initial value of the third parameter of the classification module 306.

Figure 5:
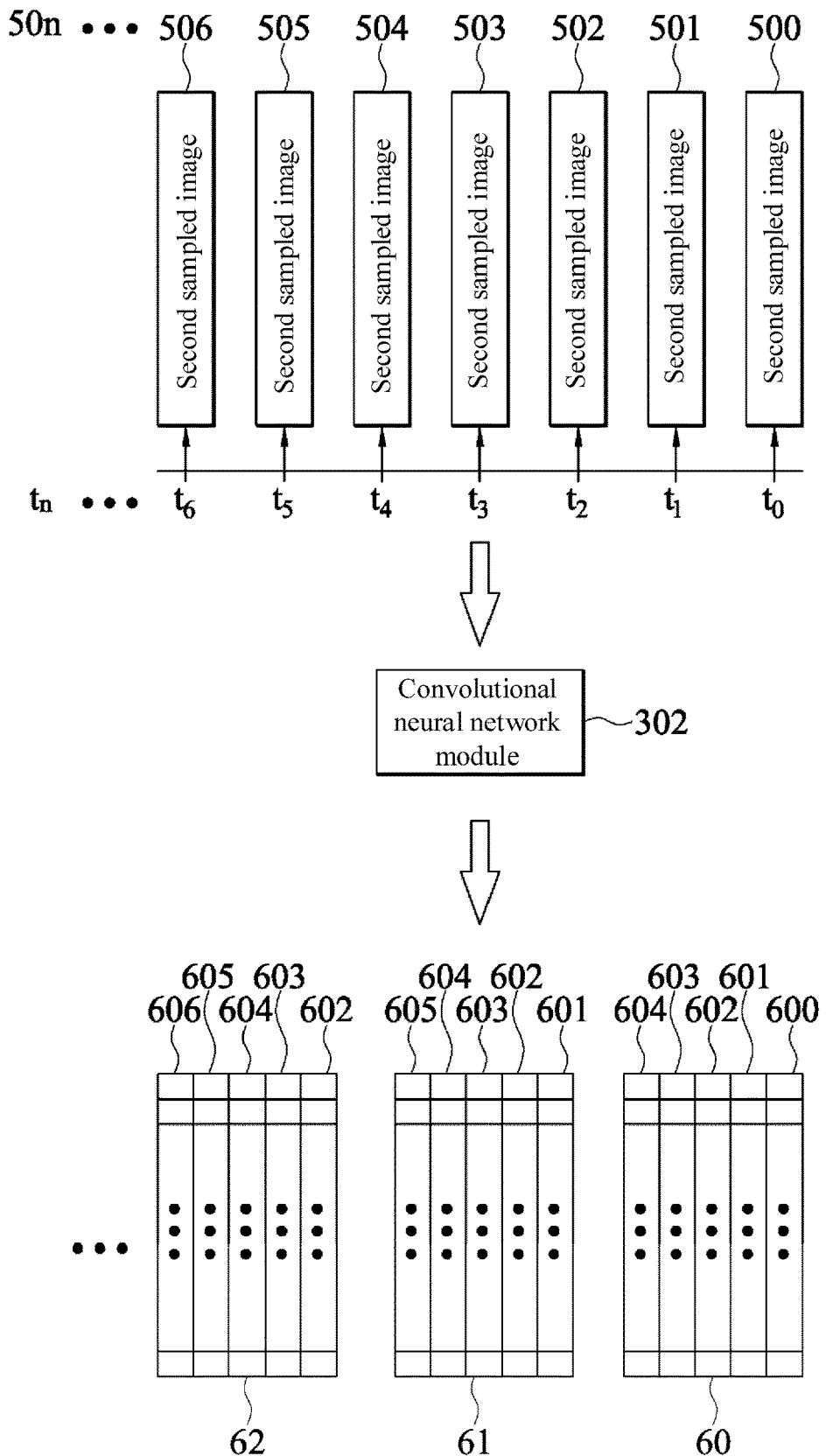
FIG. 5 is a schematic operation diagram of a neural network training system 300 shown according to some embodiments of the present invention.
Figure 13:
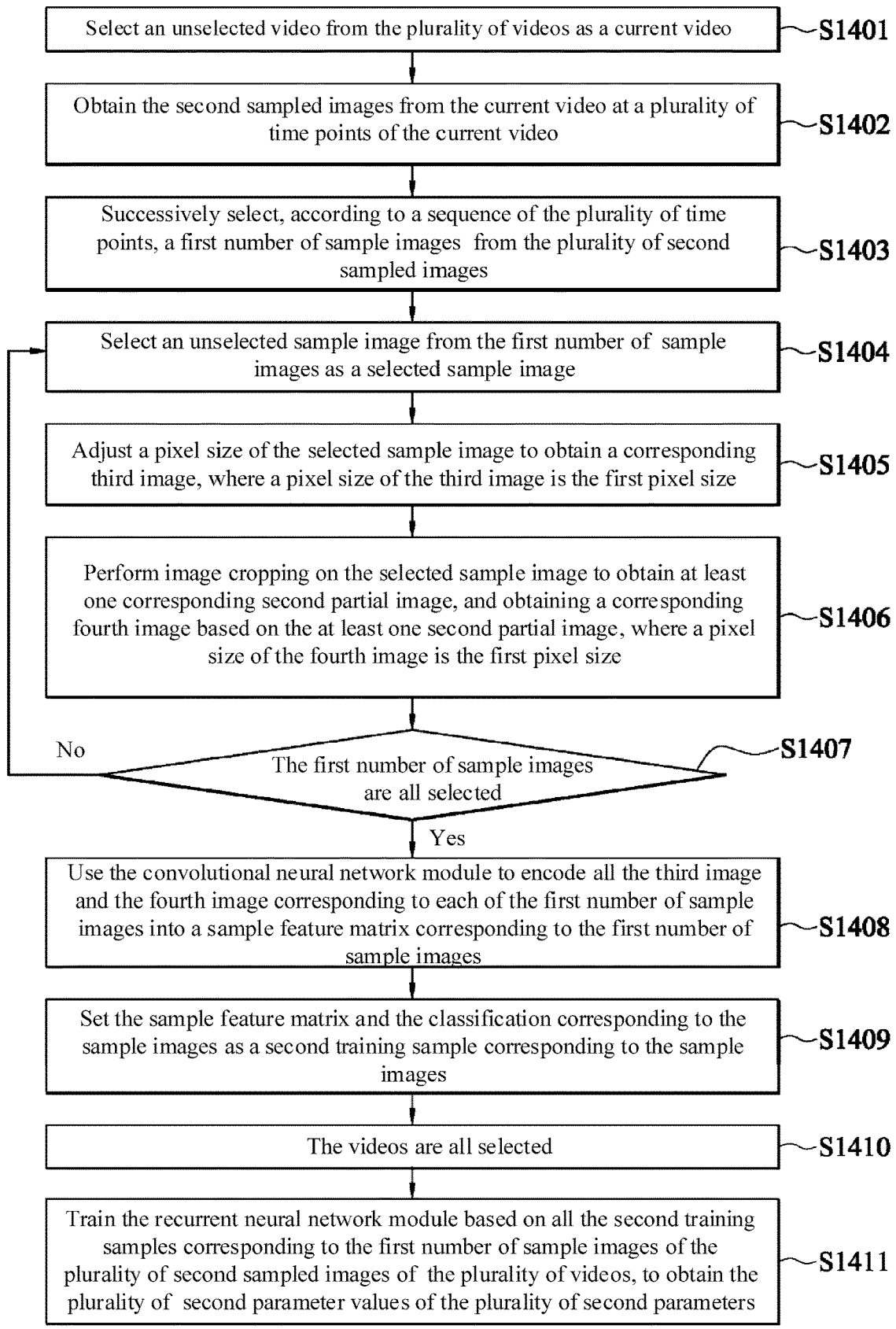
FIG. 13 is a flowchart of a video classification method shown according to some embodiments of the present invention.

FIG. 5 is a schematic operation diagram of the neural network training system 300 shown according to some embodiments of the present invention. FIG. 13 is a flowchart of a video classification method shown according to some embodiments of the present invention. Referring to FIG. 3, FIG. 5, and FIG. 13 together, as shown in FIG. 13, step S1308 further includes steps S1401 to S1411. In step S1401, the processor 301 selects an unselected video from the videos as a current video. In step S1402, the processor 301 obtains second sampled images 500, 501, 502, 503, 504, 505, 506 . . . 50n from the current video at the plurality of time points $t_0, t_1, t_2, t_3, t_4, t_5, t_6 \ldots t_n$, in the current video.

In step S1403, the processor 301 successively selects, according to a sequence of the time points $t_0, t_1, t_2, t_3, t_4, t_5, t_6 \ldots t_n$, a first number of the second sampled images from the second sampled images 500, 501, 502, 503, 504, 505, 506 . . . 50n as multiple sample images. It should be noted that, the definition of "successively" in this embodiment means that each time the selection is performed, a new second sampled image is added and an old second sampled image is reduced compared with the previous selection. Using the first number being 5 as an example: the plurality of sample images selected by the processor 301 for the first time are the second sampled images 500, 501, 502, 503, and 504. The plurality of sample images selected for the second time are the second sampled images 501, 502, 503, 504, and 505. The plurality of sample images selected for the third time are the second sampled images 502, 503, 504, 505, 506, and so on.

In step S1404, the processor 301 selects an unselected sample image from the sample images as a selected sample image. In step S1405, the processor 301 adjusts a pixel size of the selected sample image to obtain a corresponding third image, where a pixel size of the third image is the first pixel size, and in this embodiment, the first pixel size is 224×224×3. In step S1406, the processor 301 performs image cropping on the selected sample image to obtain at least one corresponding second partial image, and obtains a corresponding fourth image based on the at least one second partial image, where a pixel size of the fourth image is the first pixel size 224×224×3. In step S1407, the processor 301 repeats steps S1404, S1405, and S1406 until the sample images are all selected.

After step S1407, each of the sample images has the third image and the fourth image. In step S1408, the processor 301 uses the convolutional neural network module 302 to encode all the third images and fourth images corresponding to each sample image into a sample feature matrix corresponding to the sample images.

Herein, using the sample images being the second sampled images 500, 501, 502, 503, and 504 as an example, by repeating steps S1404, S1405, and S1406, the processor 301 may obtain the third image and fourth image corresponding to each of the second sampled images 500, 501, 502, 503, and 504. In step S1408, the processor 301 uses the convolutional neural network module 302 to encode all the third images and fourth images corresponding to the second sampled images 500, 501, 502, 503, and 504 into a sample feature matrix 60, that is, a matrix composed of vectors 600 to 604 shown in FIG. 5. The vector 600 is obtained by the processor 301 using the convolutional neural network module 302 to encode the third image and the fourth image of the second sampled image 500, and so on. A sample feature matrix 61 is a matrix composed of vectors 601 to 605, and a sample feature matrix 62 is a matrix composed of vectors 602 to 606.

In step S1409, the processor 301 sets the sample feature matrix and the classification corresponding to the sample images as a second training sample corresponding to the sample images. For example, when the selected multiple sample images are the second sampled images 500, 501, 502, 503, and 504, the second sampled images 500, 501, 502, 503, and 504 are all from the same video, and therefore the classification of this video is used as the classification of the second sampled images 500, 501, 502, 503, and 504. The sample feature matrix 60 and this classification are set as the second training sample of the sample image composed of the second sampled images 500, 501, 502, 503, and 504.

In step S1410, the processor 301 repeats steps S1401 to S1409 until all videos are selected. After step S1410, the processor 301 obtains a plurality of second training samples. In step S1411, the processor 301 trains the recurrent neural network module 304 based on all the second training samples corresponding to the sample images of the second sampled images of the plurality of videos, to obtain a plurality of second parameter values of the second parameters 305.

In some embodiments of the present invention, step S1406 further includes: the processor 301 performs image cropping at a second corresponding position of each sample image to obtain a second cropped image whose pixel size is the first pixel size 224×224×3. The processor 301 uses this second cropped image as the at least one second partial image and the fourth image, where the location of the second corresponding position is the same as that of a first corresponding position.

In some embodiments of the present invention, step S1406 further includes: the processor 301 performs image cropping at multiple second corresponding positions of each sample image to obtain multiple second cropped images whose pixel sizes are the first pixel size 224×224×3. The processor 301 uses the second cropped images as the at least one second partial image. The processor 301 then averages the second cropped images as the fourth image, where the locations of the second corresponding positions are the same as those of the first corresponding positions.

For the aforementioned reasons, in an embodiment of the present invention, a long short-term memory network is selected as the recurrent neural network module 304.

It is worth noting that, in the foregoing embodiment, the convolutional neural network module 302 is trained first, and then the recurrent neural network module 304 is trained based on the trained convolutional neural network module 302, which means the two are trained separately. Therefore, when finding that the prediction accuracy is not as expected during the test, the processor 301 may further receive other videos, and then use a first parameter value of the trained convolutional neural network module 302 to retrain the recurrent neural network module 304 according to steps S1401 to S1411, to improve the prediction accuracy.

Figure 6:
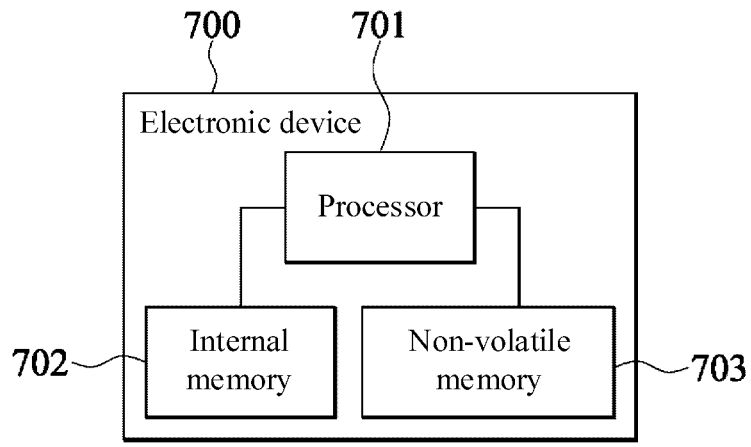
FIG. 6 is a schematic structural diagram of an electronic device 700 shown according to some embodiments of the present invention.

FIG. 6 is a schematic structural diagram of an electronic device 700 shown according to some embodiments of the present invention. As shown in FIG. 6, at a hardware level, the electronic device 700 includes a processor 701, an internal memory 702, and a non-volatile memory 703. The internal memory 702 is, for example, a random-access memory (RAM). The non-volatile memory is, for example, at least one magnetic disk memory. Certainly, the electronic device 700 may further include hardware required for other functions.

The internal memory 702 and the non-volatile memory 703 are configured to store programs, the programs may include program codes, and the program codes include computer operation instructions. The internal memory 702 and the non-volatile memory 703 provide instructions and data to the processor 701. The processor 701 reads a corresponding computer program from the non-volatile memory 703 to the internal memory 702 and then runs the corresponding computer program. The processor 701 is specifically configured to perform the steps described in FIG. 8 to FIG. 13.

The processor 701 may be an integrated circuit chip, having a signal processing capability. In an implementation process, the methods and steps disclosed in the foregoing embodiments may be completed through an integrated logic circuit that is hardware or an instruction in the form of software in the processor 701. The processor 701 may be a general purpose processor, includes a CPU, a TPU, a digital signal processor (DSP), an application specific integrated circuit (ASIC), a field-programmable gate array (FPGA), or other programmable logic devices, and may implement or perform the methods and steps disclosed in the foregoing embodiments.

An embodiment of this specification further provides a computer-readable storage medium, the computer-readable storage medium stores at least one instruction, and when executed by the processor 701 of the electronic device 700, the at least one instruction can cause the processor 701 of the electronic device 700 to perform the methods and steps disclosed in the foregoing embodiments.

Examples of computer storage media include but are not limited to: a phase change random access memory (PRAM), a static random access memory (SRAM), a dynamic random access memory (DRAM), other types of RAM, a read-only memory (ROM), an electrically erasable programmable read-only memory (EEPROM), a flash memory, or other internal memory technologies; a compact disc read-only memory (CD-ROM), a digital versatile disc (DVD), or other optical storages; a magnetic cassette, a magnetic tape type disc storage, or other magnetic storage devices; or any other non-transmission media. The computer storage media may be configured to store information that can be accessed by a computing device. Based on the definition in this specification, the computer-readable medium does not include transitory media, such as a modulated data signal and a carrier.

Based on the above, some embodiments of the present invention provide a video classification system, a video classification method, and a neural network training system, so that a video classification result can be quickly obtained by performing video classification on multiple sampling frames of a real-time video in advance using a convolutional neural network module and a recurrent neural network module trained using images two different types of information included in images captured from a video.

What is claimed is:

1. A video classification system, comprising:
a processor, configured to obtain a video;
a convolutional neural network module, having a plurality of trained first parameters; and
a recurrent neural network module, having a plurality of trained second parameters, wherein
the processor is configured to perform the following steps:
(a) selecting a present time point according to a time interval, and sampling the video according to the present time point to obtain a sampled image at the present time point;
(b) adjusting a pixel size of the sampled image at the present time point to obtain a corresponding first image, wherein a pixel size of the first image is a first pixel size, and the first pixel size of the first image is smaller than the pixel size of the sampled image;
(c) performing image cropping on the sampled image at the present time point to obtain at least one corresponding partial image, and obtaining a corresponding second image based on the at least one partial image, wherein a pixel size of the second image is the first pixel size;
(d) using the convolutional neural network module to encode the first image and the second image of the sampled image at the present time point into a feature vector corresponding to the sampled image at the present time point;
(e) sequentially merging the feature vector corresponding to the present time point with a plurality of past feature vectors corresponding to a plurality of past time points into a feature matrix; and
(f) obtaining a classification of the video based on the recurrent neural network module and the feature matrix.

2. The video classification system according to claim 1, wherein the processor performs image cropping at a corresponding position of the sampled image to obtain a cropped image whose pixel size is the first pixel size, and uses the cropped image as the at least one partial image and the second image.

3. The video classification system according to claim 1, wherein the processor performs image cropping at a plurality of corresponding positions of the sampled image to obtain a plurality of cropped images whose pixel sizes are the first pixel size, and uses the plurality of cropped images as the at least one partial image, and the processor then averages the plurality of cropped images as the second image.

4. The video classification system according to claim 1, wherein the processor uses the convolutional neural network module to encode the first image of the sampled image into a first partial feature vector, the processor uses the convolutional neural network module to encode the second image of the sampled image into a second partial feature vector, and the processor then merges the first partial feature vector with the second partial feature vector to obtain the feature vector corresponding to the present time point.

5. The video classification system according to claim 1, wherein the recurrent neural network module is a long short-term memory network.

6. A video classification method, applicable to a video classification system and performed by a processor, wherein the video classification system comprises:
the processor, configured to obtain a video;
a convolutional neural network module, having a plurality of trained first parameters; and
a recurrent neural network module, having a plurality of trained second parameters, wherein
the video classification method comprises the following steps:
(a) selecting a present time point according to a time interval, and sampling the video according to the present time point to obtain a sampled image at the present time point;
(b) adjusting a pixel size of the sampled image at the present time point to obtain a corresponding first image, wherein a pixel size of the first image is a first pixel size, and the first pixel size of the first image is smaller than the pixel size of the sampled image;

(c) performing image cropping on the sampled image at the present time point to obtain at least one corresponding partial image, and obtaining a corresponding second image based on the at least one partial image, wherein a pixel size of the second image is the first pixel size;

(d) using the convolutional neural network module to encode the first image and the second image of the sampled image at the present time point into a feature vector corresponding to the sampled image at the present time point;

(e) sequentially merging the feature vector corresponding to the present time point with a plurality of past feature vectors corresponding to a plurality of past time points into a feature matrix; and (f) obtaining a classification of the video based on the recurrent neural network module and the feature matrix.

7. The video classification method according to claim 6, wherein step (d) further comprises: performing image cropping at a corresponding position of the sampled image to obtain a cropped image whose pixel size is the first pixel size, and using the cropped image as the at least one partial image and the second image.

8. The video classification method according to claim 6, wherein step (d) further comprises: performing image cropping at a plurality of corresponding positions of the sampled image to obtain a plurality of cropped images whose pixel sizes are the first pixel size, using the plurality of cropped images as the at least one partial image, and then averaging the plurality of cropped images as the second image.

9. The video classification method according to claim 6, wherein step (d) further comprises: using the convolutional neural network module to encode the first image of the sampled image into a first partial feature vector, and using the convolutional neural network module to encode the second image of the sampled image into a second partial feature vector, and then merging the first partial feature vector with the second partial feature vector to obtain the feature vector corresponding to the present time point.

10. The video classification method according to claim 6, wherein the recurrent neural network module is a long short-term memory network.

11. A neural network training system, comprising:
a processor, configured to obtain a plurality of videos, a plurality of training images, and a classification corresponding to each of the plurality of videos and each of the plurality of training images;
a convolutional neural network module, having a plurality of first parameters;
a recurrent neural network module, having a plurality of second parameters; and
a classification module, having a plurality of third parameters, wherein
the processor is configured to perform the following steps:
(a) obtaining a plurality of first sampled images from the videos and the training images;
(b) selecting an unselected image from the plurality of first sampled images as a current image;
(c) adjusting a pixel size of the current image to obtain a corresponding first image, wherein a pixel size of the first image is a first pixel size, and the first pixel size of the first image is smaller than the pixel size of the current image;

(d) performing image cropping on the current image to obtain at least one corresponding first partial image, and obtaining a corresponding second image based on the at least one first partial image, wherein a pixel size of the second image is the first pixel size;

(e) setting the classification corresponding to the first image, the second image, and the current image as a first training sample corresponding to the current image;

(f) repeating steps (b), (c), (d), and (e) until the plurality of first sampled images are all selected;

(g) using all the first training samples corresponding to each of the plurality of first sampled images to train a first synthesis network synthesized by the convolutional neural network module and the classification module, to obtain a plurality of first parameter values corresponding to the plurality of first parameters; and (h) training the recurrent neural network module based on the first parameter values and a plurality of second sampled images obtained from each of the plurality of videos, to obtain a plurality of second parameter values corresponding to the plurality of second parameters.

12. The neural network training system according to claim 11, wherein step (h) that the processor is configured to perform further comprises:

(h1) selecting an unselected video from the plurality of videos as a current video;

(h2) obtaining the plurality of second sampled images from the current video at a plurality of time points of the current video;

(h3) successively selecting, according to a sequence of the plurality of time points, a first number of sample images from the plurality of second sampled images;

(h4) selecting an unselected sample image from the first number of sample images as a selected sample image;

(h5) adjusting a pixel size of the selected sample image to obtain a corresponding third image, wherein a pixel size of the third image is the first pixel size;

(h6) performing image cropping on the selected sample image to obtain at least one corresponding second partial image, and obtaining a corresponding fourth image based on the at least one second partial image, wherein a pixel size of the fourth image is the first pixel size;

(h7) repeating steps (b), (c), and (d) until the first number of sample images are all selected;

(h8) using the convolutional neural network module to encode all the third image and the fourth image corresponding to each of the first number of sample image into a sample feature matrix corresponding to the sample images; and (h9) setting the sample feature matrix and the classification corresponding to the first number of sample images as a second training sample corresponding to the first number of sample images;

(h10) repeating steps (h1) to (h9) until the plurality of videos are all selected; and (h11) training the recurrent neural network module based on all the second training samples corresponding to the first number of sample images of the plurality of second sampled images of the plurality of videos, to obtain the plurality of second parameter values of the plurality of second parameters.

13. The neural network training system according to claim 12, wherein the processor performs image cropping at a first corresponding position of each of the plurality of first sampled images to obtain a first cropped image whose pixel size is the first pixel size, and uses the first cropped image as the at least one first partial image and the second image; and the processor performs image cropping at a second corresponding position of each of the first number of sample images to obtain a second cropped image whose pixel size is the first pixel size, and uses the second cropped image as the at least one second partial image and the fourth image, wherein the location of the second corresponding position is the same as that of the first corresponding position.

14. The neural network training system according to claim 12, wherein the processor performs image cropping at a plurality of first corresponding positions of each of the plurality of first sampled image to obtain a plurality of first cropped images whose pixel sizes are the first pixel size, and uses the plurality of first cropped images as the at least one first partial image, and the processor then averages the plurality of first cropped images as the second image; and the processor performs image cropping at a plurality of second corresponding positions of each of the first number of sample image to obtain a plurality of second cropped images whose pixel sizes are the first pixel size, and uses the plurality of second cropped images as the at least one second partial image, and the processor then averages the plurality of second cropped images as the fourth image, wherein the locations of the plurality of second corresponding positions are the same as those of the plurality of first corresponding positions.

15. The neural network training system according to claim 11, wherein the recurrent neural network module is a long short-term memory network.

* * * * *